United States Patent [19]

De Vogel et al.

[11] Patent Number: 4,740,843
[45] Date of Patent: Apr. 26, 1988

[54] METHOD AND DEVICE FOR RECOGNIZING HALF-TONE IMAGE INFORMATION

[75] Inventors: Robert De Vogel, Eindhoven; Lucas J. J. M. Meekes, Enschedé, both of Netherlands

[73] Assignee: Oce-Nederland B.V., Venlo, Netherlands

[21] Appl. No.: 945,781

[22] Filed: Dec. 23, 1986

[30] Foreign Application Priority Data

Dec. 24, 1985 [NL] Netherlands .................. 8503558

[51] Int. Cl.$^4$ ............................................... H04N 1/40
[52] U.S. Cl. ..................................... 358/283; 358/298
[58] Field of Search ..................... 358/283, 280, 298

[56] References Cited

U.S. PATENT DOCUMENTS

| 4,194,221 | 3/1980 | Stoffel | 358/283 |
| 4,630,125 | 12/1986 | Roetling | 358/280 |
| 4,633,327 | 12/1986 | Roetling | 358/283 |

FOREIGN PATENT DOCUMENTS 89931 9/1983 European Pat. Off. .

Primary Examiner—Tommy P. Chin
Attorney, Agent, or Firm—Reed Smith Shaw & McClay

[57] ABSTRACT

A method and device for recognizing half-tone image information having a local frequency within predetermined limits such that an information area which may also contain other kinds of image information, is scanned line by line to generate a video signal or series of pixels which is subjected to a recognition process to determine, for each part of the signal, whether the same belongs to half-tone image information, wherein: the grey level maxima in the signal above a predetermined high threshold value are determined; the distance between each two successive grey level maxima is determined and compared with a predetermined fixed distance; and for the part of the signal between two successive maxima a positive decision is made that the information in that part of the signal is half-tone image information if the distance between two successive grey level maxima previously determined to be above a predetermined high threshold value and a predetermined fixed distance lies within predetermined limits. This method is simpler than other known methods, requires less complex calculations and can be at least approximately performed in real time even with fast scanning of the original.

18 Claims, 3 Drawing Sheets

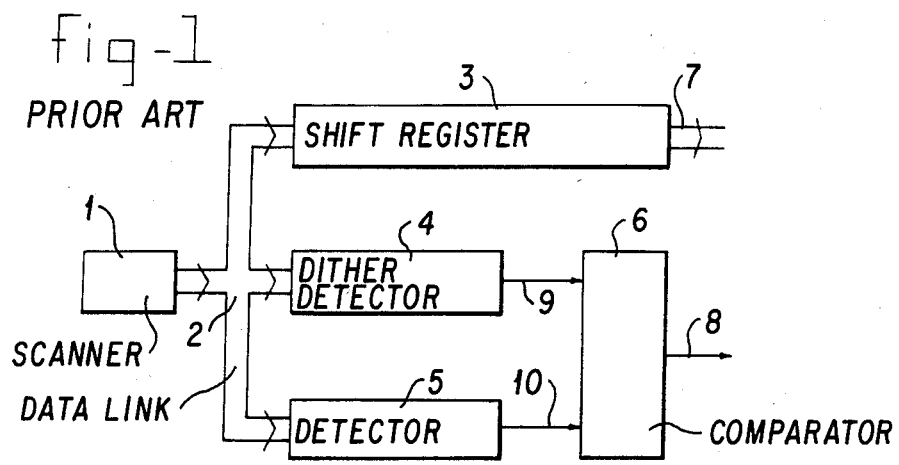
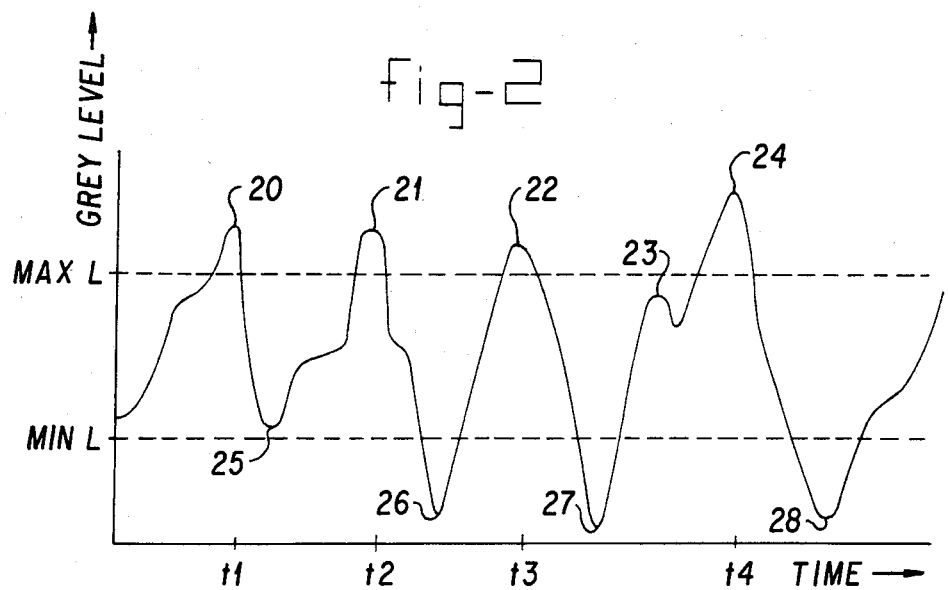

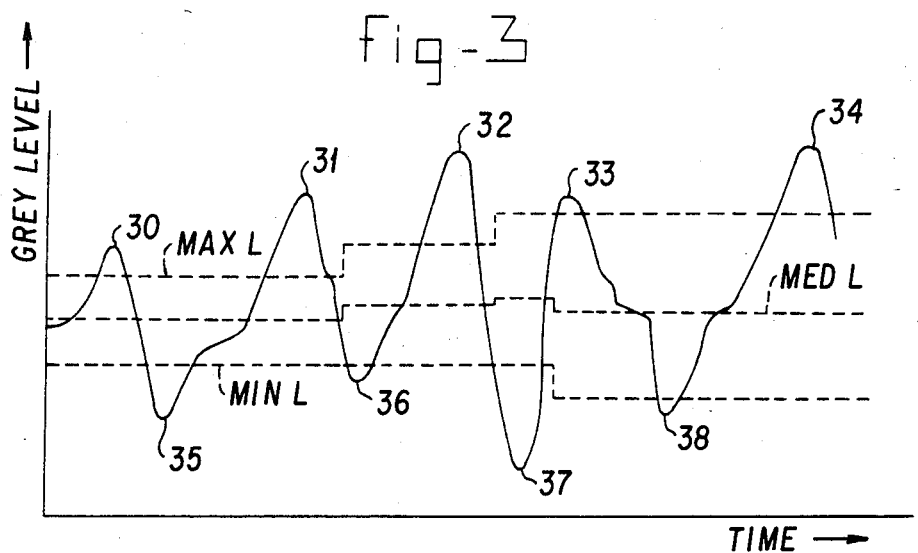
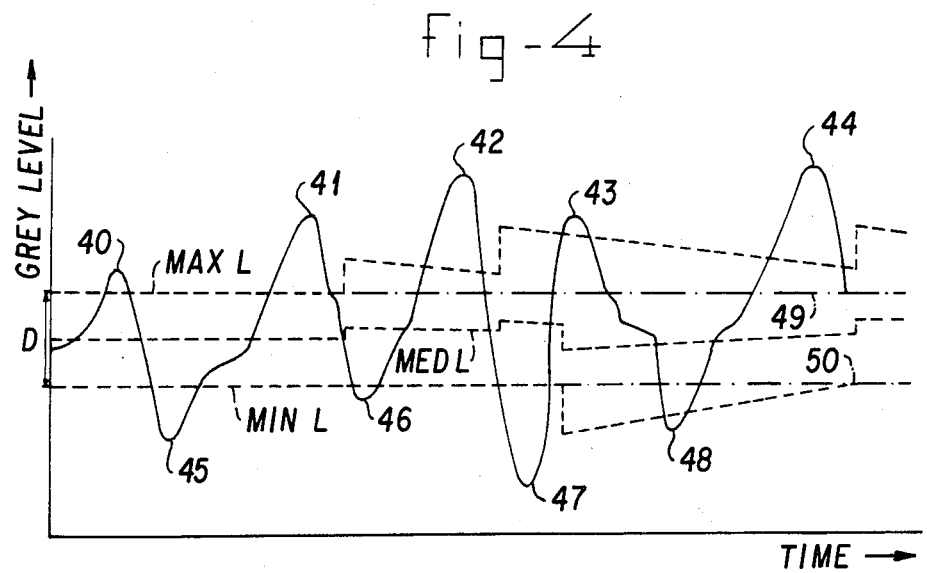

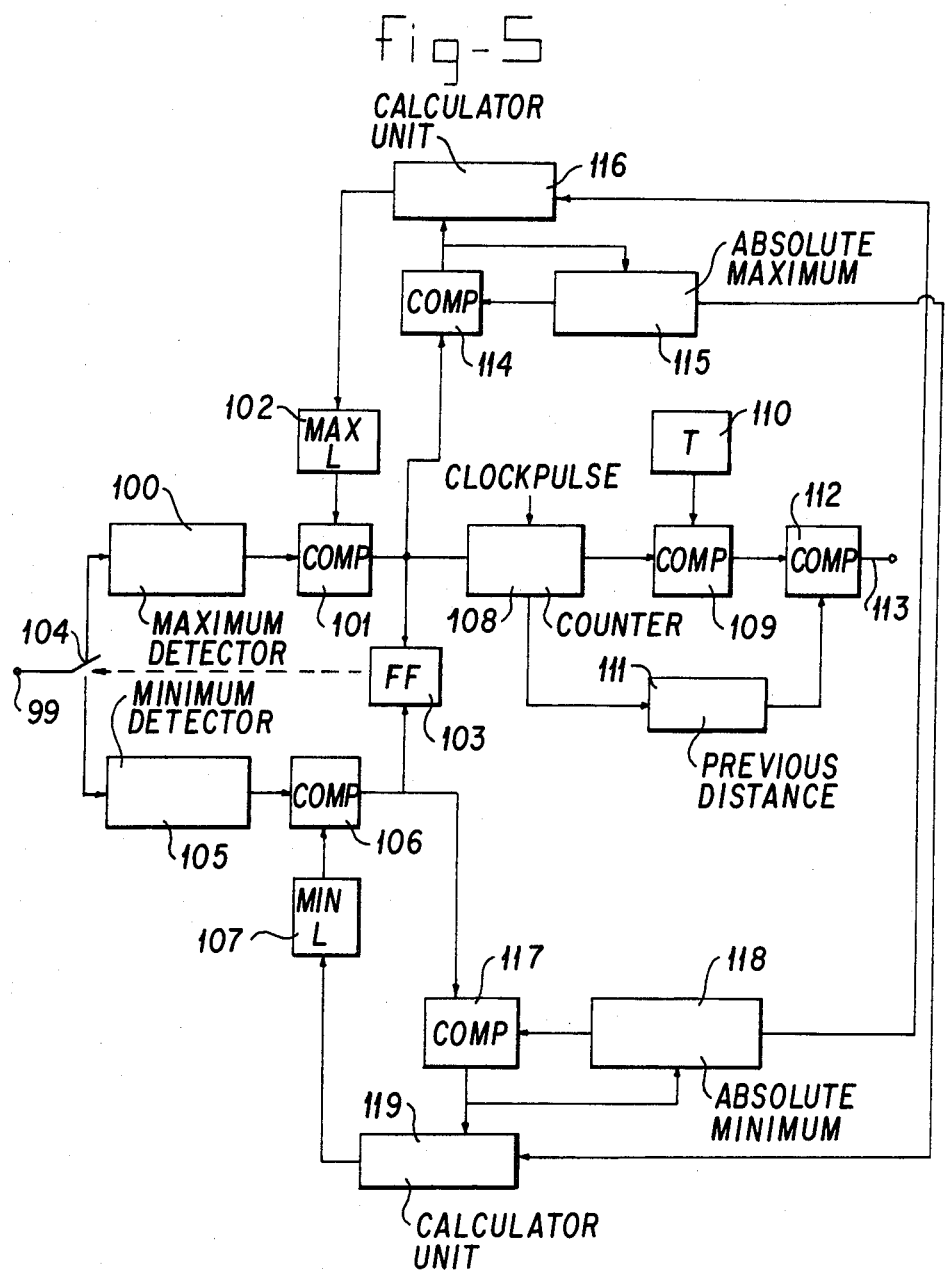

METHOD AND DEVICE FOR RECOGNIZING HALF-TONE IMAGE INFORMATION

FIELD OF THE INVENTION

The present invention relates to a method and device for recognizing half-tone image information by generating a video signal or a series of pixels which is subjected to a recognition process to determine which parts belong to half-tone image formation.

BACKGROUND OF THE INVENTION

In the reproduction of an original image using image data available in the form of a video signal or a series of pixels obtained from line by line scanning of an original such as by means of a video camera, an array of charge-coupled elements, and the like, the type of original image must be taken into account because if the original image consists wholly or partly of a half-tone image, disturbing patterns may occur in the reproduction depending upon the method of reproduction used. See European Patent Application No. 89,931 for one type of device for scanning and digitally processing half-tone images.

With regard to image information, a distinction may be made between the following: (a) text, which has a substantially regular distribution of grey level flanks, the distance between which differs according to the text in question, but is generally on the order of 3 mm; (b) line drawings, which have steep grey level flanks with an irregular rather than regular distribution, the distance between the flanks may be less than in the case of text, on the order of 0.5 mm; (c) continuous tone images (i.e. photographs) where the grey levels usually vary slowly and gradually, so that the flanks are less steep with no regular distribution; and (d) half-tone images or dither images, which frequently have a regular pattern of grey level peaks with slowly varying peak height, however, the local frequency at which these peaks occur is high and therefore the distance between the peaks is relatively low, on the order of a few tenths of a millimeter.

When an image is reproduced by means of a dither process, moire patterns may occur at the places where half-tone image information is present in the image and this is very undesirable. On the other hand, by means of special reproduction techniques known per se and intended more particularly for the processing of half-tone image information, it is possible to avoid the occurrence of such disturbing patterns. For image information to be processed during the reproduction process in the correct way depending upon the type of information, it is necessary to know what part of the complete image information area contains half-tone image information. There is therefore a need for a method by means of which a distinction can be made between half-tone image information and other types of image information.

A method and a device for distinguishing between half-tone image information and other types of image information is described in U.S. Pat. No. 4,194,221. There, a video signal originates from an image scanner and available in the form of a series of pixels at the output of the CCD (charge coupled device) scanner. This signal is temporarily stored in a shift register and is subjected to an autocorrelation process in which an autocorrelation function is calculated in each case for a predetermined number of successive pixels. In this function the peak values are detected and finally the distances between these peak values are determined. If these distances are less than a predetermined threshold value or, in other words, if the frequency of the autocorrelation function is higher than a specific threshold value, the decision is taken that the relevant number of pixels represents high-frequency half-tone image data.

This known device has a number of disadvantages. Calculating the autocorrelation function for each of a series of pixels, detection of the peak values therein, and determination of the distances between these peak values is relatively time consuming and requires a considerable memory capacity in the device with which the method is performed. Thus a considerable amount of time is required to process all the information of the original image and this means that scanning of the original must take place relatively slowly or, if the original is scanned quickly, a relatively large memory is required to be able to store, at least temporarily, the video signal or the generated series of pixels.

It would be desirable to provide a method which is simpler than this known method, requires less complex calculations and can be at least approximately performed in real time even where fast scanning of the original occurs. It also would be desirable to provide a device for performing a method of this kind without the need for large capacity memories and which can be implemented with relatively simple means both in the form of a hardware circuit and in the form of an appropriately programmed microprocessor with peripheral circuits.

SUMMARY OF THE INVENTION

Generally, the present invention relates to a method and device for recognizing half-tone image information having a local frequency within predetermined limits such that an information area which may also contain other kinds of image information is scanned line by line to generate a video signal or series of pixels which is subjected to a recognition process to determine, for each part of the signal, whether the same belongs to half-tone image information, wherein (a) the grey level maxima in the signal above a predetermined high threshold value are determined; (b) the distance between each two successive grey level maxima is determined and compared with a predetermined fixed distance; and (c) for the part of the signal between two successive grey level maxima, a positive decision is made that the information in that part of the signal relates to half-tone image information if the distance between two successive grey level maxima determined in step (b) and the predetermined fixed distances lies within predetermined limits.

The method according to the present invention comprises a series of relatively simple process steps. For the determination of the grey level maxima in a video signal or series of pixels as called for in step (a), various algorithms are known which can be performed simply and quickly both in hardware and in software. The comparison of two values in step (b) can also be easily and quickly implemented both in hardware and in software. Even without a large number of extra aids the result of this comparison lends quickly to the final decision which is called for in step (c).

The present invention also provides a device for recognizing half-tone image information using the method described above which device has a recognition unit provided with a maximum detector for determining the grey level maxima in the signal, a first comparator for comparing each grey level maximum with a high threshold value stored in a memory, which comparator, on the occurrence of a grey level maximum above the threshold value, delivers a signal to a counter controlled by fixed frequency clock pulses which stops the counter so that its contents are compared in a second comparator with a reference value stored in memory so that the second comparator delivers an output signal to the output of the recognition unit if the contents of the counter lie within a predetermined range around the reference value. After the comparison in the second comparator, the counter is reset and starts counting again.

The present invention is simpler than other known methods and devices, requires less complex calculations and can be at least approximately performed in real time even with fast scanning of the original.

Other advantages of the present invention will become apparent from the detailed description and the accompanying drawings of presently preferred embodiments of the best mode of carrying out the invention.

BRIEF DESCRIPTION OF THE INVENTION

FIG. 1 represents a general block-diagram of a device for scanning an original image and processing the resulting image information.

FIGS. 2, 3 and 4 illustrate the application of various processing methods according to the present invention to different signals containing half-tone information.

FIG. 5 illustrates a device according to the present invention for processing image information originating from a scanner or camera.

DESCRIPTION OF THE PREFERRED EMBODIMENTS

FIG. 1 represents a device in which the method of the present invention can be applied. This device is provided with a scanning unit or image scanner with which the original image is scanned. The scanning unit, for example, may produce 20 pixels per mm and 256 grey levels per pixel. Instead of an image scanner of this kind, it is, of course, possible to use a video camera or the like. The series of pixels or the analog video signal generated by scanner 1 is first fed via data link 2 to a shift register or delay unit 3 which is used to delay the incoming signal over a specific period of time. The delayed signal is delivered at the output of shift register 3 to data link 7.

Secondly, the signal is fed to a half-tone image information detector or dither detector 4 where the incoming signals are processed to determine whether at least parts of the incoming signals relate to half-tone image portions. A decision representing the determination with regard to half-tone image portions is delivered to output 9.

The generated video signal or series of pixels is also fed if required to a further detector 5 in which a detection can be carried out if required on signal parts originating from those parts in the original image which contain text, line drawings or continuous tone images (photographs). Detector 5 delivers at its output a decision as to which signal parts are characterized as belonging to one of the types of images.

If only detector 4 is used, then the decision output signal given on line 9 which indicates only whether a certain signal part does or does not belong to a half-tone image part, forms the characteristic that is added to the associated part of the signals which are on data link 7. If detector 5 or any other detectors are also used, then the output signals of the various detectors, in this case detectors 4 and 5, are fed via the outputs 9 and 10 preferably to a comparator 6 with which the output signals are compared in order to avoid any nonclarity in the output signals delivered by the detectors. A code by means of which a given signal part is clearly characterized is then delivered via output 8.

The present invention relates particularly to a half-tone image detector or dither detector 4 and its operation. A number of methods according to the present invention will be explained hereinafter with reference to FIGS. 2, 3 and 4 and the signals shown therein.

In the usual printing units or reproduction units with which dithered images of half-tone images are produced, dither calls are used with dimensions varying between 200×200 $\mu$m and 400×400 $\mu$m. This means that the number of image cells per mm varies between about 2.5 and 5. Dither detector 4 is particularly intended to recognize this form of dither.

If an image is scanned with a very fine-scanning scanner, such as one scanning with 20 pixels per mm then scanning of a dithered image part will produce a signal having a fairly regular pattern of grey level peaks wherein the peak height varies only slowly. Examples of such signals are given in FIGS. 2, 3 and 4.

Using the method of the present invention, dither detector 4 first of all determines where the grey level maxima are situated in the incoming signal based on the condition that each grey level maximum must lie at least above a predetermined high threshold value. In the input signal shown in FIG. 2, the high threshold value is defined by the level MAX L where peaks 20, 21, 22 and 24 rise above this grey level MAX L. Peak 23, however, does not rise above the level MAX L and thus does not satisfy the condition. As soon as a grey level maximum is found which is also above the level MAX L, its occurrence time is detected and then the time elapsing until the next grey level maximum above MAX L occurs is determined. The period of time elapsing until the next maximum above MAX L is related to the distance between the two maxima. In FIG. 2, the distance between maxima 20 and 21 is defined by (t2−t1). Similarly, the distance between maxima 22 and 21 is defined by (t3−t2) and so on for the other maxima.

Each time a distance has been determined, that distance is compared with a predetermined fixed distance T related to the local frequency of the half-tone image information or dither information. If the difference between the fixed distance T and the determined distance (t2−t1) lies within predetermined limits, the decision is made with respect to the signal part between peak 20 and peak 21 that this part of the signal belongs to a half-tone image part. If, however, the distance does not satisfy these conditions, the decision is made that no half-tone image information is involved in this signal part.

While this method, alone, gives very satisfactory and usable results, a number of improvements have been found to be possible. A first improvement can be obtained by comparing the determined distance (i.e. the distance between the last two successive grey level maxima) not only with the fixed distance T but also with the directly preceding determined distance (i.e. the distance between the third to last and the next to last successive grey level maxima). This means that a test is carried out not only to see whether $|T-(t3-t2)|<tg1$ where tg1 indicates a predetermined limit or margin, but also to see whether $|(t2-t1)-(t3-t2)|<tg2$ where tg2 is another predetermined limit or margin which can be set arbitrarily.

A further improvement in the results can be obtained by subjecting the grey level maxima to still another condition such as that a next maximum cannot be determined unless after the determination of the maximum, the grey level in the signal has fallen at least once below a predetermined low threshold value. This low threshold value is indicated by MIN L in FIG. 2. Applying this condition to the signal shown in FIG. 2, grey level maximum 21 is no longer considered in the calculation since although maximum 20 is followed by a minimum 25, this minimum is not situated below the level MIN L. Only after minimum 26 occurs can a new maximum 22 be found which satisfies all the conditions. In this preferred embodiment of a method of the present invention, only the maxima 20, 22 and 24 in FIG. 2 are taken into account.

FIG. 3 illustrates another embodiment of the method according to the present invention. In this embodiment, a relatively low threshold value for MAX L and a relatively high threshold value for MIN L are initially selected as a basies. At each grey level maximum and each grey level minimum the magnitude of the difference between the maximum or minimum and the associated threshold value is determined and for those maxima and minima which are higher and lower, respectively, than the instantaneous associated threshold value, an upper reference level is then calculated which is equal to the lowest grey level minimum encountered until then plus a predetermined percentage of the detected difference between the highest grey level maximum encountered until then and the lowest grey level minimum encountered until then. If the threshold value MAX L is below this upper reference level, the threshold value MAX L is raised to that reference level.

A similar procedure can be applied for determining the threshold value MIN L. A lower reference level is calculated which is equal to the lowest grey level minimum encountered until then plus a predetermined percentage of the determined difference between the highest grey level minimum encountered until then and the lowest grey level minimum encountered until then. If the threshold value MIN L is above this lower reference level, the threshold value MIN L is lowered to that reference level.

FIG. 3 is based on arbitrarily chosen threshold values MAX L and MIN L. After the occurrence of the first maximum 30 and the first minimum 35, the above calculation can be carried out which, in this case, has the result that the threshold values have been correctly selected and hence are not changed after the occurrence of minimum 35. On the next higher grey level maximum 31, however, this calculation carried out with the amplitude values of maxima 31 and 30 teaches that the threshold value MAX L is below the calculated upper reference level and hence, as shown in FIG. 3, the level of MAX L is raised to the calculated upper reference level. In FIG. 3, a certain delay time has intentionally been introduced between the occurrence of maximum 31 and the increase of the threshold value MAX L, such time being necessary to perform the required calculation. It will, however, be clear that this time can be very short.

On the next grey level maximum 32 which is higher than the highest maximum 31 encountered until then, it is also apparent that the threshold value MAX L then used is below the calculated upper reference level and consequently, again after a certain delay period, the threshold value MAX L is again adjusted to the calculated upper reference level. On the next following maximum 33, no further change takes place, and the same applies to the next maximum 34, because at both maxima the threshold value MAX L is above the calculated upper reference level.

A similar procedure is applied with respect to the low threshold value MIN L. After maximum 30 and minimum 35 have occurred, the lower reference level is calculated as indicated already hereinbefore and it is apparent from this that in the first instance the threshold value MIN L has been correctly chosen. This threshold value is therefore not changed. After the occurrence of minimum 36 no change takes place either. On the occurrence of minimum 37, however, the level MIN L proves to be too high. The last calculation based on maximum 32 and minimum 37 shows that the threshold value MIN L has to be reduced. This reduction in turn takes place after a certain delay period necessary for performing the required calculations. At the following minimum 38, the level MIN L remains unchanged.

With this embodiment of the invention, the two threshold values MAX L and MIN L are self-adjusting. It has been found that reliable decisions can be taken in step (c) of the method according to the present invention with similar self-adjusting grey levels.

It will be apparent that when the method described with reference to FIG. 3 is used, centering of the levels MAX L and MIN L occurs around an average grey level which can be regarded as the 50% level, the 0% level being determined by the lowest minimum detected until then and the 100% level being determined by the highest maximum detected until then. Another embodiment of the method according to the present invention is now based on this average grey level, which is denoted by MED L in FIG. 3. Level MED L will be adjusted at the same times at which the levels MAX L or MIN L are adjusted in FIG. 3. After some time, the level MED L will have adjusted itself to the value corresponding to 50%. The associated high threshold value MAX L can then be selected, for example, at 80% and the low threshold value MIN L will then come to lie at 20%.

Yet another indication of the reliability of the method according to the present invention is obtained in an embodiment whose effect is illustrated in FIG. 4. In this method, just as in FIG. 3, the high threshold value MAX L is initially set at a value indicated by the dot-dash line 49 and the low threshold value MIN L is initially set at a value indicated by the dot-dash line 50. The levels indicated by lines 49 and 50 are preferably selected at a predetermined distance D from one another. Care must be taken to ensure that the high and low threshold values always differ from one another by at least distance D.

In the same way as in the method shown in FIG. 3, if the high threshold value MAX L is found to be below the calculated upper reference level the threshold value is adjusted. After detection of maximum 41, therefore, the level of MAX L is increased to the calculated upper reference level. Thereafter, however, the value of MAX L does not remain constantly at the new value as in FIG. 3, but returns at a given speed or rate of decay to the level indicated by line 49. On the occurrence of the next grey level maximum 42 it is again found that the high threshold value is in fact too low and this threshold value is again adjusted to the newly calculated upper reference level. Once again, however, there is a gradual drop from the high threshold value at a predetermined speed or rate of decay.

A similar process takes place in the case of the low threshold value MIN L. At the first two minima, 45 and 46, no threshold value change is carried out because they do not cause the threshold value MIN L to be above the calculated lower reference value. At minimum 47, however, the threshold value MIN L proves to be too high and this value is reduced to the calculated lower reference level. Thereafter, however, the threshold value will increase with a certain speed to the level indicated by dot-dash line 50.

An average line denoted by MED L in FIG. 4 can also be taken as a base in this embodiment. At the same times in FIG. 4 at which adjustment takes place to the high threshold value and the low threshold value, a corresponding adjustment will also take place to the level MED L. The high threshold value and the low threshold value can now again be set as a percentage of this average level MED L.

Because the original image is scanned line by line, the transitions in the line direction between halftone image information and other kinds of image information are determined for each line. In the column direction, however, there has until now been no consideration of the transitions between half-tone image information and other kinds of image information.

It may generally be assumed that a specific type of information in an original image will occur in a more or less regular structure such as in rectangular blocks. An example is an original which is partially provided with printed text and partially with photographs which will generally have a rectangular closed shape. Therefore, it is advantageous to compare the decisions taken for adjacent lines with one another in order thus to exclude any illogical decisions. Preferably, the procedure in this case is such that a recognition decision for a following adjacent scanning line is maintained if the recognition decision for the corresponding part of the previous line is identical. If, however, the decision for the corresponding part of the previous line is not identical, the decision for the current line is changed to "not unambiguously recognizable." If the decision for the previous line is "not unambiguously recognizable" the decision for the current line is considered correct and not changed.

The advantage of this method is that no unclear situations arise at the transistion between one type of image information and another other type of image information. Although the decision "not unambiguously recognizable" is taken for a scanning line situated exactly at the transition between one type of information and another type, so that the information on that line might, as it were, be lost, the information which clearly belongs to a given image type is unambiguously recognized as such.

FIG. 5 shows a block-diagram of detector 4 which can perform several of the preferred methods of the present invention. The incoming signals are fed from input 99 via switch 104 to a maximum detector 100 or a minimum detector 105. In the position illustrated for switch 104, the signals are fed to maximum detector 100, wherein a maximum value in the incoming flow of grey values is detected. As soon as a maximum has been found, it is compared in comparator 101 with the level of the high threshold value MAX L stored in a register or memory 102. If the detected maximum is greater than MAX L, comparator 101 delivers a signal to flip-flop 103 which ensures (via the dashed control line) that switch 104 is changed over to the other position. From then on, the incoming signals are fed to minimum detector 105 wherein the minima in the signals are detected. If a minimum value is found, that value is compared in comparator 106 with the low threshold value MIN L which is stored in memory or register 107. If the detected minimum is lower than MIN L, comparator 106 delivers a signal to flip-flop 103 which in response again changes overs switch 104 via the control line to the position shown in FIG. 5.

The part of the circuit described so far detects the maxima in the incoming signals which lie above a predetermined high threshold value MAX L and which also occur after the occurrence of a minimum value lower than a low threshold value MIN L.

On the occurrence of a maximum which satisfies all the requirements, comparator 101 will deliver a signal to counter 108, the contents of which varies continuously in response to the clock pulses fed to it. Counter 108 will stop as a result of the signal from comparator 101. The contents of counter 108 representing the time elapsed since the last maxima satisfying all the conditions is compared in comparator 109 with a predetermined period T stored in memory or register 110. The contents of counter 108 is also transmitted to a memory or register 111 whereinafter counter 108 is reset to restart counting. If comparator 109 detects that the contents of counter 108 is within predetermined limits around the fixed value T, the contents is transmitted to comparator 112 wherein it is compared with the previous contents contained in register 111. If the difference between the two contents also lies within predetermined limits, comparator 112 will deliver a positive decision signal to output 113 indicating that this portion of the signal relates to half-tone image information.

The circuit containing the components described so far operates with fixed high and low threshold values MAX L and MIN L, respectively. As described hereinbefore, it is preferable to work with varying threshold values. In one of the preferred methods described above, the threshold values were made dependent upon the absolute maximum and minimum grey levels found in the preceding signal. The circuit and components for implementing this are also shown in FIG. 5. Whenever a new maximum is detected which satisfies all the previously described requirements, this maximum is fed by comparator 101 (or directly from maximum detector 100 under the control of comparator 101) to a comparator 114 wherein this maximum is compared with the absolute maximum grey level stored in a register or memory 115. If the detected maximum is greater than the absolute maximum stored in register 115, the detected maximum is stored in register 115 instead of the previous value. Also, the new absolute maximum is fed to calculator unit 116, wherein starting from the new absolute maximum and the absolute minimum stored in register 118, a new high threshold value MAX L is calculated. This new high threshold value is then fed to register 102 instead of the value presently therein.

A similar operation takes place on the low threshold value side. As soon as comparator 106 has detected a minimum below the minimum level MIN L, this minimum will be fed by comparator 106 (or by minimum detector 105 under the control of comparator 106) to a comparator 117 wherein the detected minimum is compared with the absolute minimun stored in a register or memory 118. If the detected minimum is higher than the absolute minimum, no further action takes place. If, however, the detected minimum is lower than the absolute minimum, the detected minimum is stored in register 118 instead of the value presently therein. Also, the detected minimum which is now equal to the absolute minimum is fed to calculator unit 119 in which, on the basis of this new value and the absolute maximum from register 115, a new low threshold level MIN L is calculated which is fed from calculator unit 119 to register 107 instead of the value presently therein.

A method of the type illustrated in FIG. 4 could be embodied by means of the circuit shown in FIG. 5 by arranging for calculator units 116 or 119 to calculate a new threshold value at fixed intervals. The new threshold value would be reduced (in the case of the high threshold value) or increased (in the case of the low threshold value) with respect to the preceding threshold value by a predetermined factor (i.e. at a predetermined speed or rate of decay). The change of the threshold value is continued until a predetermined limit is reached, which is indicated by the dot-dash lines 49 and 50 in FIG. 4.

Although FIG. 5 shows a large number of separate elements or units, it will be apparent that various units can be combined in a practical embodiment. Thus, a person skilled in the art will find no problems in replacing calculator units 116 and 119, comparators 114 and 117, registers 115 and 118, and registers 102 and 107 by a single calculator unit combined with a suitable register or memory. It is also possible to embody at least a large part of the necessary hardware in the form of a suitably programmed computer.

While presently preferred embodiments of the best mode of carrying out the present invention have been shown and described with particularity, the invention may be otherwise embodied within the scope of the appended claims.

What is claimed is:

1. A method of recognizing half-tone image information having a local frequency within predetermined limits such that an information area which may also contain other kinds of image information is scanned line by line to generate a signal which is subjected to a recognition process to determine, for each part of the signal, whether that part of the signal contains said half-tone image information comprising the steps of:
   (a) successively identifying by comparison a plurality of grey level maxima in the signal which are above a predetermined high threshold value;
   (b) calculating a measured distance for each part of the signal between each successive grey level maxima found in step (a) and comparing the measured distance with a predetermined fixed distance; and
   (c) deciding for each part of the signal between each successive grey level maxima found in step (a), that it contains said half-tone image information if the comparison made in step (b) lies within a first predetermined limit.

2. The method as described in claim 1, wherein step (b) comprises the additional step of comparing the measured distance for each part of the signal between each successive grey level maxima with a previously measured distance for that part of the signal between the two immediately preceding grey level maxima and wherein step (c) comprises the additional step of deciding that each part of the signal between each successive grey level maxima contains said half-tone image information if the comparison made in step (b) between the measured distance and the previously measured distance lies within a second predetermined limit.

3. The method as described in claim 1 wherein a grey level maximum can be identified in step (a) only if the signal has fallen at least once below a predetermined low threshold value since the identification of an immediately preceding grey level maximum.

4. The method as described in claim 3 wherein the predetermined high threshold value can vary and is determined from a part of the signal previously processed and wherein a new predetermined high threshold value is calculated from a last lowest grey level minimum plus a predetermined percentage of the difference between a last highest grey level maximum and the last lowest grey level minimum.

5. The method as described in claim 3 wherein the predetermined low threshold value can vary and is determined from a part of the signal previously processed and wherein a new predetermined low threshold value is calculated from a last lowest grey level minimum plus a predetermined percentage of the difference between a last highest grey level maximum and the last lowest grey level minimum.

6. The method as described in claim 4 wherein after the new predetermined high threshold value is calculated, the new predetermined high threshold value is reduced at a predetermined speed.

7. The method as described in claim 5 wherein after the new predetermined low threshold value is calculated, the new predetermined low threshold value is increased at a predetermined speed.

8. The method as described in claim 6 wherein a predetermined minimum difference is maintained between the new predetermined high threshold level and the new predetermined low threshold value.

9. The method as described in claim 7 wherein a predetermined minimum difference is maintained between the new predetermined high threshold level and the new predetermined low threshold level.

10. The method as described in claim 1 wherein a recognition decision for a part of the signal belonging to a scanning line is compared with a preceding recognition decision for the previously adjacent scanning line and either: the recognition decision of the scanning line is maintained if it is equal to the preceding recognition decision, or the recognition decision is changed if it is unequal to the preceding recognition decision, or the recognition decision is maintained if the preceding recognition decision was changed.

11. A device for recognizing half-tone image information having a local frequency within predetermined limits such that an information area which may also contain other kinds of image information is scanned line by line by a scanning means to generate a signal which is subjected to a recognition process in a recognition unit to determine, for each part of the signal, whether the part of the signal belongs to said half-tone image information, wherein the recognition unit comprises: a maximum detector by means of which maxima in the signal are determined; a first comparator connected to the maximum detector wherein each detected maximum is compared with a high threshold value stored in a first memory; a counter controlled by clock pulses at a fixed frequency which on the detection in the first comparator of a maximum above the high threshold value registers the contents therein; a second comparator connected to the counter for comparing the registered contents of the counter with a fixed value stored in a second memory and delivering an output signal to the output of the recognition unit if the registered contents of the counter lie within a predetermined area around the reference value.

12. A device as described in claim 11, wherein the registered contents of the counter are stored in a third memory and if the second comparator delivers said output signal, the registered contents of the counter are compared in a third comparator with the previously registered contents stored in the third memory, the third comparator delivering an output signal to the output of the recognition unit if the difference between the registered contents of the counter and the previously registered contents stored in the third memory is within predetermined limits.

13. A device as described in claim 11 wherein the recognition unit further comprises: a minimum detector by means of which minima in the signal are determined; a fourth comparator connected to the minimum detector wherein each minimum is compared with a low threshold value stored in a fourth memory; a flip-flop which is activated by the fourth comparator and the first comparator on the occurrence of a minimum below the low threshold value to bring the flip-flop into a first position wherein the flip-flop provides a connection between the input of the recognition unit and the maximum detector; and wherein on the occurrence of a maximum above the level of the high threshold value, the first comparator activates the flip-flop to bring it into a second position wherein the flip-flop establishes a connection between the input of the recognition unit and the minimum detector.

14. A device as described in claim 12 wherein the recognition unit further comprises: a minimum detector by means of which minima in the signal are determined; a fourth comparator connected to the minimum detector wherein each minimum is compared with a low threshold value stored in a fourth memory; a flip-flop which is activated by the fourth comparator and the first comparator on the occurrence of a minimum below the low threshold value to bring the flip-flop into a first position wherein the flip-flop provides a connection between the input of the recognition unit and the maximum detector; and wherein on the occurrence of a maximum above the level of the high threshold value, the first comparator activates the flip-flop to bring it into a second position wherein the flip-flop establishes a connection between the input of the recognition unit and the minimum detector.

15. A device as described in claim 13 wherein the recognition unit further comprises a fifth comparator connected to the first comparator for comparing the maximum above the high threshold value as determined by the first comparator with an absolute maximum value stored in a fifth memory, which said fifth comparator on the maximum above the high threshold value being above the absolute minimum value feeds the maximum above the high threshold value to the fifth memory to replace the absolute maximum value therein with a new absolute maximum value and also feeds the new absolute maximum value to a calculator unit wherein a new high threshold value is calculated which is then stored in the first memory.

16. A device as described in claim 14 wherein the recognition unit further comprises a fifth comparator connected to the first comparator for comparing the maximum above the high threshold value as determined by the first comparator with an absolute maximum value stored in a fifth memory, which said fifth comparator on the maximum above the high threshold value being above the absolute maximum value feeds the maximum above the high threshold value to the fifth memory to replace the absolute minimum value therein with a new absolute maximum value and also feeds the new absolute maximum value to a calculator unit wherein a new high threshold value is calculated which is then stored in the first memory.

17. A device as described in claim 15 wherein the recognition unit further comprises a sixth comparator connected to the fourth comparator for comparing the minimum below the low threshold value as determined by the fourth comparator with an absolute minimum value stored in a sixth memory, which said sixth comparator on the minimum below the low threshold value being below the absolute minimum value feeds the minimum below the low threshold value to the sixth memory in order to replace the absolute minimum value therein with a new absolute minimum value and also feeds the new absolute minimum value to a second calculator unit wherein a new low threshold value is calculated which is then stored in the fourth memory.

18. A device as described in claim 16 wherein the recognition unit further comprises a sixth comparator connected to the fourth comparator for comparing the minimum below the low threshold value as determined by the fourth comparator with an absolute minimum value stored in a sixth memory, which said sixth comparator on the minimum below the low threshold value being below the absolute minimum value feeds the minimum below the low threshold value to the sixth memory in order to replace the absolute minimum value therein with a new absolute minimum value and also feeds the new absolute minimum value to a second calculator unit wherein a new low threshold value is calculated which is then stored in the fourth memory.

* * * * *

UNITED STATES PATENT AND TRADEMARK OFFICE
CERTIFICATE OF CORRECTION

PATENT NO. : 4,740,843
DATED      : April 26, 1988
INVENTOR(S) : DeVogel et al.

It is certified that error appears in the above—identified patent and that said Letters Patent is hereby corrected as shown below:

Column 1, line 8:  please delete --formation-- and substitute "information" therefor.
Column 1, line 60: please insert "is" after "available".
Column 4, line 18: please delete --calls-- and substitute "cells" therefor.
Column 5, line 26: please delete --basies-- and substitute "basis" therefor.
Column 7, line 18: please delete --line-- and substitute "level" therefor.
Column 7, line 54: please delete --other-- after "another".
Column 9, line 4:  please delete --minimun-- and substitute "minimum" therefor.
Column 12, line 6: please delete --minimum-- and substitute "maximum" therefor.

Signed and Sealed this

Twenty-second Day of November, 1988

Attest:

DONALD J. QUIGG

Attesting Officer        Commissioner of Patents and Trademarks